(12) United States Patent
Gregory

(10) Patent No.: US 7,083,219 B1
(45) Date of Patent: Aug. 1, 2006

(54) RETRACTABLE STORAGE SYSTEM FOR TRUCKS

(76) Inventor: Shawn P. Gregory, 18550 Road 26, Dolores, CO (US) 81323

( * ) Notice: Subject to any disclaimer, the term of this patent is extended or adjusted under 35 U.S.C. 154(b) by 68 days.

(21) Appl. No.: 10/973,782

(22) Filed: Oct. 26, 2004

(51) Int. Cl.
*B60P 7/02* (2006.01)

(52) U.S. Cl. ............... 296/100.12; 296/37.6; 296/26.09; 414/522

(58) Field of Classification Search .......... 296/100.12, 296/37.6, 39.2, 26.08, 26.09; 414/522
See application file for complete search history.

(56) References Cited

U.S. PATENT DOCUMENTS

| | | | |
|---|---|---|---|
| 2,094,401 A | 9/1937 | Girl | |
| 2,104,912 A | 1/1938 | Streeter | |
| 2,229,785 A | 12/1941 | Wray | |
| 2,284,419 A * | 5/1942 | Greig | 296/26.09 |
| 2,545,269 A | 3/1951 | Ford | |
| 2,549,018 A * | 4/1951 | Sarlo | 296/26.09 |
| 2,784,027 A * | 3/1957 | Temp | 296/26.09 |
| 2,792,137 A | 5/1957 | Solomon et al. | |
| 2,797,828 A | 7/1957 | Fritsche | |
| 2,872,261 A * | 2/1959 | Dobbratz et al. | 384/17 |
| 3,534,892 A * | 10/1970 | Truelove, Sr. | 224/401 |
| 3,726,422 A | 4/1973 | Zelin | |
| 4,305,695 A * | 12/1981 | Zachrich | 414/522 |
| 4,469,364 A | 9/1984 | Rafi-Zadeh | |
| 4,483,504 A * | 11/1984 | Duwelshoft | 248/429 |
| 4,573,731 A * | 3/1986 | Knaack et al. | 296/37.6 |
| 4,681,360 A | 7/1987 | Peters et al. | |
| 4,705,315 A * | 11/1987 | Cherry | 296/37.6 |
| 4,733,898 A * | 3/1988 | Williams | 296/39.2 |
| 4,824,158 A * | 4/1989 | Peters et al. | 296/37.6 |
| 4,841,883 A | 6/1989 | Kukovich | |
| 4,909,558 A * | 3/1990 | Roshinsky | 296/37.6 |
| 4,950,123 A * | 8/1990 | Brockhaus | 414/522 |
| 5,026,176 A * | 6/1991 | Jensen et al. | 384/53 |
| 5,046,913 A | 9/1991 | Domek et al. | |
| 5,052,878 A | 10/1991 | Brockhaus | |
| 5,127,697 A * | 7/1992 | St. Marie | 296/26.09 |
| 5,454,684 A * | 10/1995 | Berens | 414/522 |
| 5,564,767 A * | 10/1996 | Strepek | 296/26.09 |
| 5,649,731 A * | 7/1997 | Tognetti | 296/26.09 |
| 5,931,632 A | 8/1999 | Dongilli et al. | |
| 5,934,725 A * | 8/1999 | Bowers | 296/26.09 |
| 5,974,667 A * | 11/1999 | Bryson | 29/898.03 |
| 5,988,722 A | 11/1999 | Parri | |
| 6,065,792 A * | 5/2000 | Sciullo et al. | 296/26.09 |
| 6,120,075 A * | 9/2000 | Terry | 296/26.09 |
| 6,318,780 B1 * | 11/2001 | St. Aubin | 296/26.09 |
| 6,328,364 B1 * | 12/2001 | Darbishire | 296/26.09 |
| 6,422,567 B1 | 7/2002 | Mastrangelo et al. | |

(Continued)

*Primary Examiner*—Kiran B. Patel
(74) *Attorney, Agent, or Firm*—Ramon L. Pizarro; Edwin H. Crabtree

(57) ABSTRACT

A system for forming a retractable cargo support for use over the bed of a truck is disclosed. The system includes a slide system with an elongated slide base having an upwardly opening U-shaped cross-section, an intermediate slide that is slidably mounted within the U-shaped cross-section of the slide base has an upwardly opening U-shaped cross section, and a top slide. The top slide includes a downwardly opening U-shaped cross-section, and is adapted for nesting in a sliding relationship within the U-shaped cross-section of the intermediate slide. A load surface is attached to the top slide, so that mounting the slide base to the bed of the truck allows the load surface to be slid in and out of the bed of the truck.

18 Claims, 10 Drawing Sheets

U.S. PATENT DOCUMENTS

2002/0180231 A1    12/2002  Fox
2004/0100388 A1*    5/2004  Yoshida et al. .......... 340/686.1

2004/0155476 A1*    8/2004  Emery et al. .............. 296/37.6

* cited by examiner

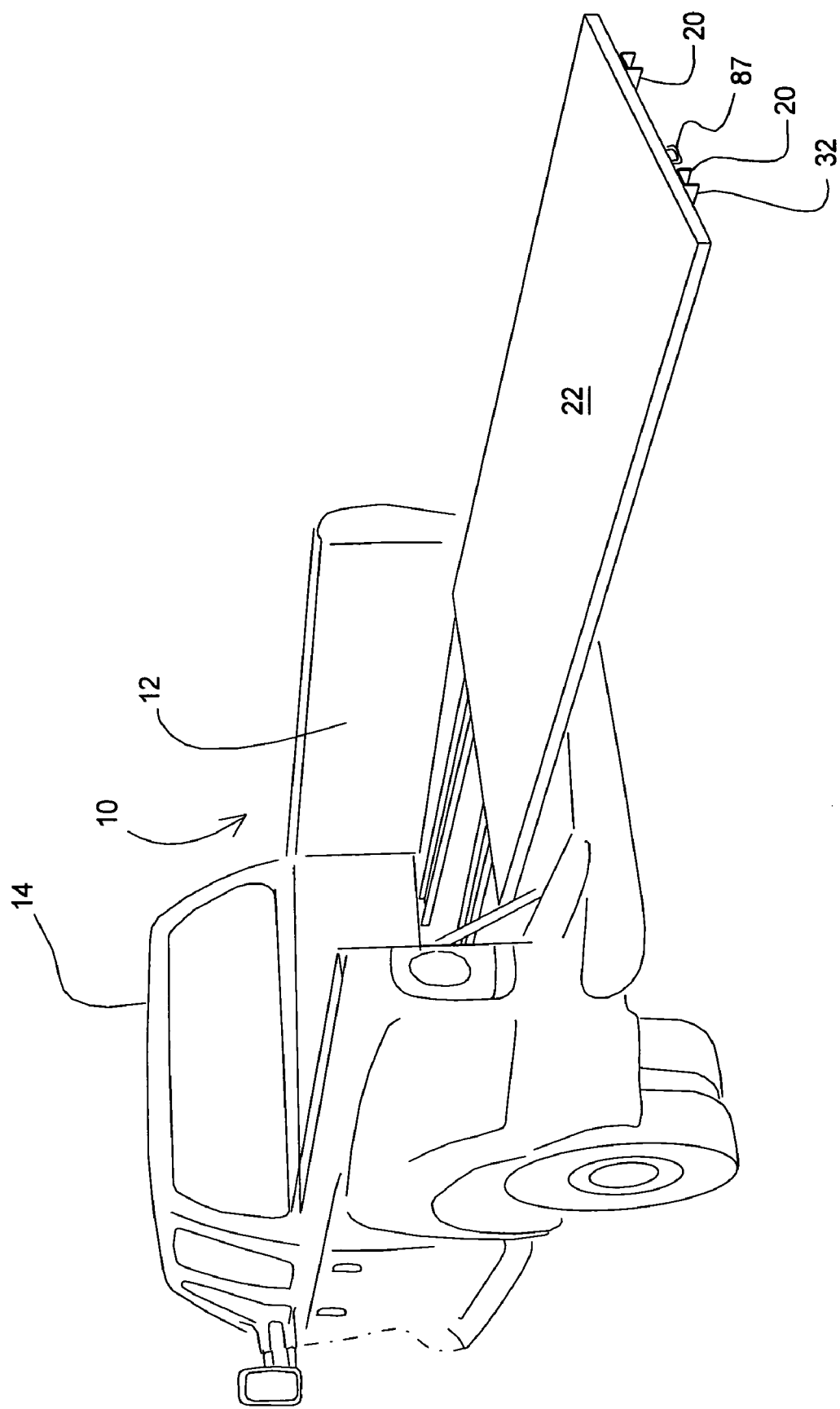

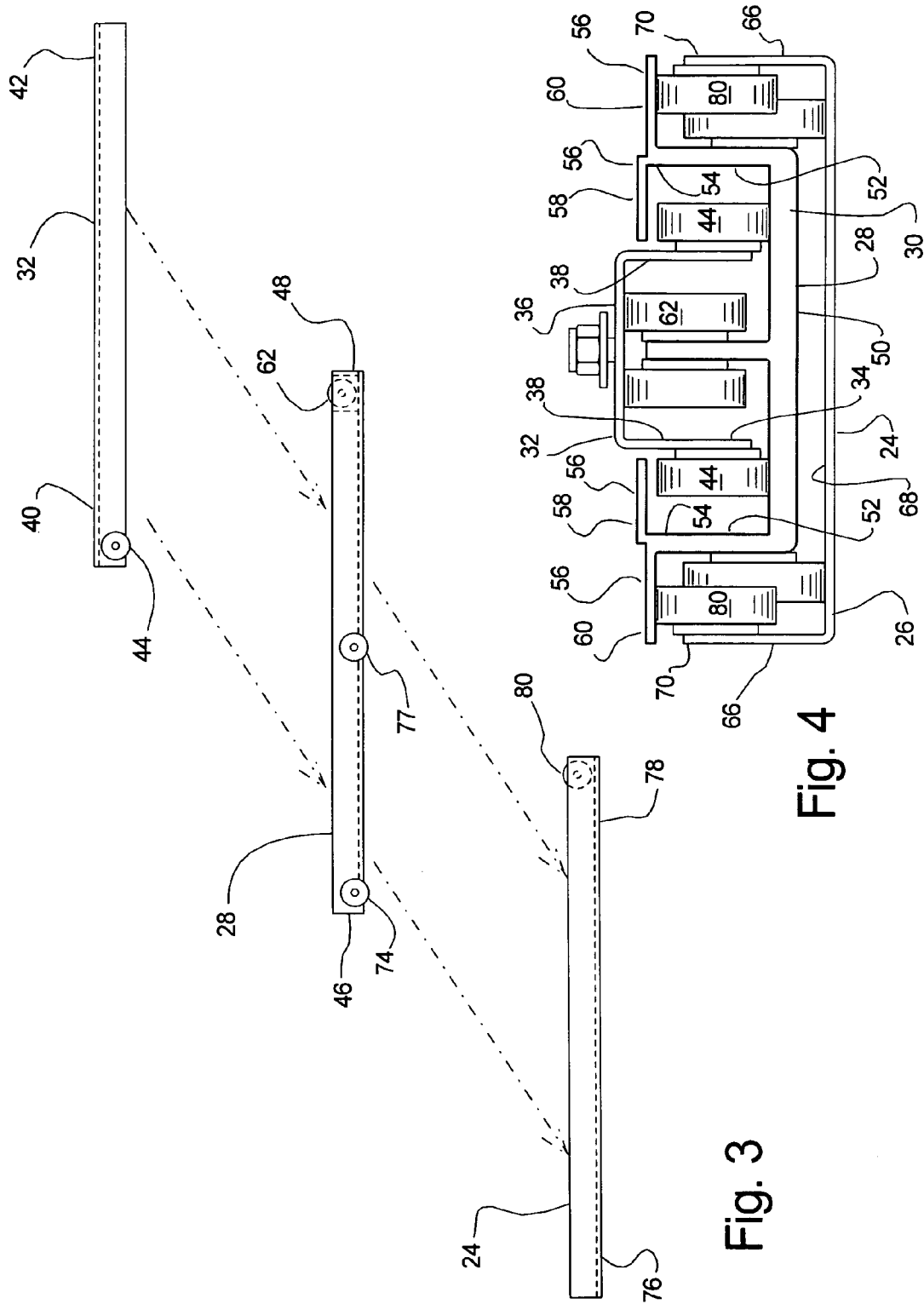

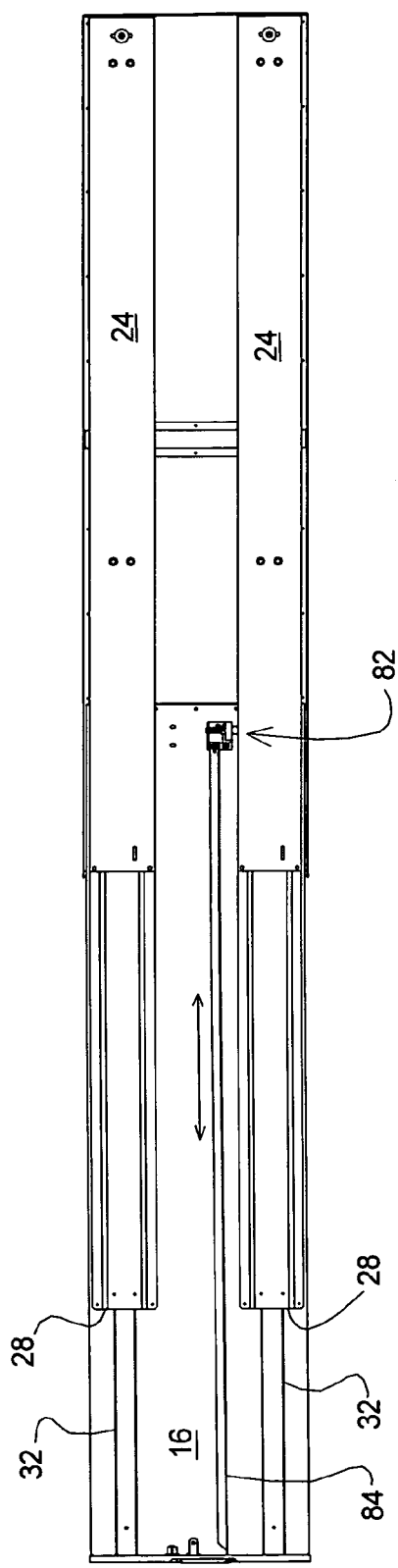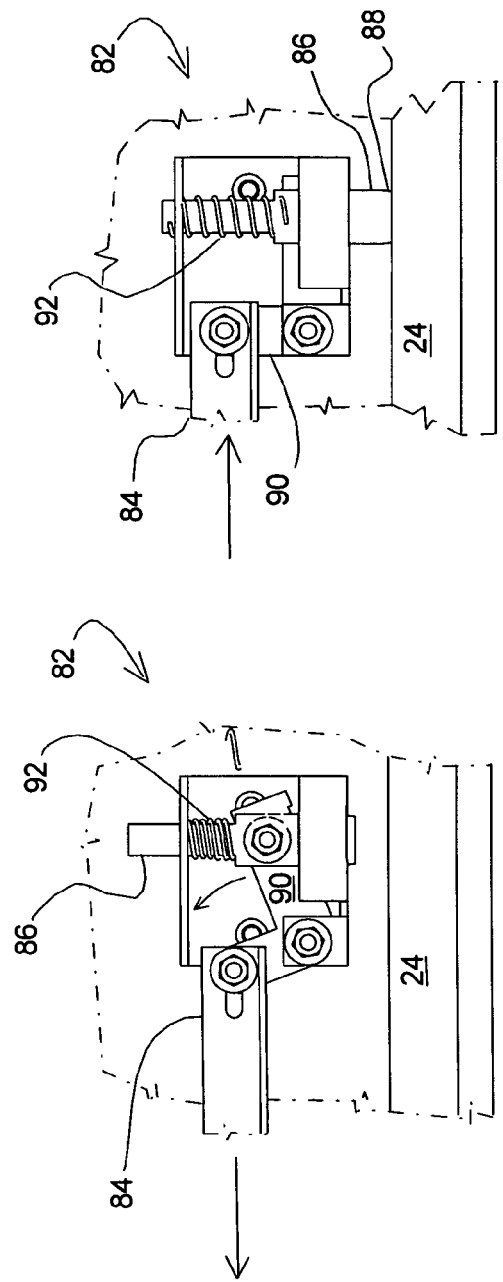

RETRACTABLE STORAGE SYSTEM FOR TRUCKS

BACKGROUND OF THE INVENTION (a) Field of the Invention

This invention generally relates to a system for sliding a storage or cargo area in and out of the bed of a truck. More particularly, but not by way of limitation, to a track and mounting system that is used to support heavy loads in a cantilevered maner from the end of the bed of a truck.

(b) Discussion of Known Art

Pickup trucks (referred to herein as a truck) are extremely popular due in large part to the great versatility of the bed of these trucks. A typical example of the bed of a truck includes a floor, fixed sides, and a tailgate that provides access to the area over the floor and enclosed by the sides. A significant problem associated with this arrangement is that the fixed sides can impede access to items inside the bed, making it necessary for the user to climb inside the bed in order to retrieve these items.

A review of known art reveals that there are several known devices designed to facilitate the removal of items from the bed of the truck. Examples of these devices can be found in U.S. Pat. Nos. 5,052,878 and 4,950,124 to Brockhaus. The Brockhaus devices show the use of a multiple stage extension mechanism that is used to support a cargo platform. Other examples can be found in U.S. Pat. No. 5,931,632 to Dongilli et al. and U.S. Pat. No. 4,841,883 to Kukovich, Jr.

A significant disadvantage associated with known devices is the amount of space of the truck's bed they take up. Inefficient structural design found in these known devices results in the need to provide large structures in order to provide the strength required when the cargo device is extended. Furthermore, known devices are often limited in the amount of travel that is achievable with these structures. For example, the arrangements taught by Brockhaus are limited in the final position achieved by the extending "pack" of rails relative to the base or support rail "pack" that is attached to the bed of the truck. This is evidenced by the fact that a portion of any of the rail "packs" always overlaps another rail "pack" at all times as shown in the illustrations of the Brockhaus references.

Another limitation of known movable cargo platforms is that the railing is often placed on the outside of the cargo platform or drawer, taking up space between the sides of the bed and the cargo platform. Examples of this type of arrangement can be found in U.S. Pat. No. 4,573,731 to Knaack et al., U.S. Pat. No. 2,284,419 to Greig, and U.S. Pat. No. 2,784,027 to Temp.

A review of known devices reveals there remains a need for a retractable cargo support and related components that provide a retractable cargo support that allows the entire cargo area to be moved out from over the bed of the truck.

A review of known devices reveals that there remains a need for a retractable cargo support that maximizes the use of the cargo area of the bed of the truck.

A review of known art reveals that there remains a need for a retractable cargo support system for use over the bed of a truck, the cargo support system incorporating sets of tracks that can be provided in quantities needed to modify the amount of strength needed from the assembled system.

There remains a need for a cargo support system that can be retracted, and the location of the cargo support area relative to the system is easily and reliably controlled.

SUMMARY

It has been discovered that the problems left unanswered by known art can be solved by providing a system for forming a retractable cargo support for use over the bed of a truck, an example of the system includes:
- a slide system comprising:
  - an elongated slide base having an upwardly opening U-shaped cross-section;
  - an elongated intermediate slide having an upwardly opening U-shaped cross-section, the intermediate slide being adapted for nesting in a sliding relationship within the U-shaped cross section of the slide base;
  - a top slide, the top slide having a downwardly opening U-shaped cross-section, the top slide being adapted for nesting in a sliding relationship within the U-shaped cross-section of the intermediate slide; and
  - a load surface that is attached to the top slide, so that mounting the slide base to the bed of the truck allows the load surface to be slid in and out of the bed of the truck.

According to a preferred example of the invention the slide base includes a first end and a second end, and the U-shaped cross-section is formed from a pair of spaced apart sidewalls that extend away from a base floor and terminate in an upper edge. The upper edge of the sidewalls including a generally horizontal flange that extends over the base floor. The sidewalls of the slide base include a set of rollers at second end of the slide base.

Additionally, it is contemplated that the intermediary slide will include a first end, a second end and a mid-section. The intermediary slide will also include a generally U-shaped cross-section defined by a horizontal section and a pair of generally vertical parallel sidewalls that extend from the horizontal section and terminate in an upper edge away from the horizontal section. The upper edge includes a pair of horizontal wings that extend on both sides of the sidewalls of the intermediary section. The wings serve as surfaces for cooperating with rollers. It is also contemplated that the intermediary slide will include a set of rollers that are mounted on the sidewalls near the first end of the intermediary slide, positioned such that the intermediary slide lies between the rollers. Additionally, the intermediary slide will include a roller that is mounted over the horizontal section, between the sidewalls, at a location near the second end of the intermediary slide.

As to the top slide, it is contemplated that the top slide will be elongated and include a first end and a second end. The U-shaped cross-section will be formed from a pair of spaced apart sidewalls that extend downward from a horizontal cap. A pair of spaced apart rollers are mounted from the sidewalls of the top slide at a location near the first end of the top slide, such that the top slide lies between the rollers.

The nesting of the intermediary slide in the slide base will allow the rollers on the first end of the intermediary slide to cooperate with the rollers at the first end of the slide base, so that the intermediary slide moves in a generally parallel manner to the slide base. Additionally, the top slide will be supported in a parallel manner over the intermediary portion by the cooperation of the rollers on the first end of the top slide and the roller mounted form the horizontal portion of the second end of the intermediary slide. Thus, it will be understood that the disclosed arrangement will allow the intermediary slide and the top slide to move in a parallel manner relative to the slide base. Still further, it will be understood that the wings on the intermediary slide will cooperate with the sidewalls and horizontal surface of the intermediary slide in order to form a strong beam.

A large bending moment is produced in the intermediary slide when a heavy load supported by the top slide is introduced into the intermediary slide while the intermediary slide and the top slide are extended. The intermediary slide acts as a beam resisting this bending moment as compression in the horizontal surface and tension in the wings, with a shear load carried by the sidewalls of the intermediary slide.

Thus, it will be understood that the disclosed structure provides a particularly strong and compact slide arrangement. Multiple assemblies of this slide arrangement can be positioned in a side-by-side arrangement to provide increased support and strength as needed for supporting large loads.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 2 illustrates an example of the invention while in use as part of a sliding load surface for the bed of a truck.

FIG. 3 is a schematic illustrating the assembly of the slides used with the disclosed invention.

FIG. 4 is an end view, looking from the second end of the slide base towards the first end of the slide base, of the assembled slide rails and slide base.

FIG. 10 is a view looking up at the slide assembly while in use as part of a drawer within a drawer case.

FIG. 11A illustrates the locking mechanism in an unlocked position.

FIG. 11B illustrates the locking mechanism in a locked position.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
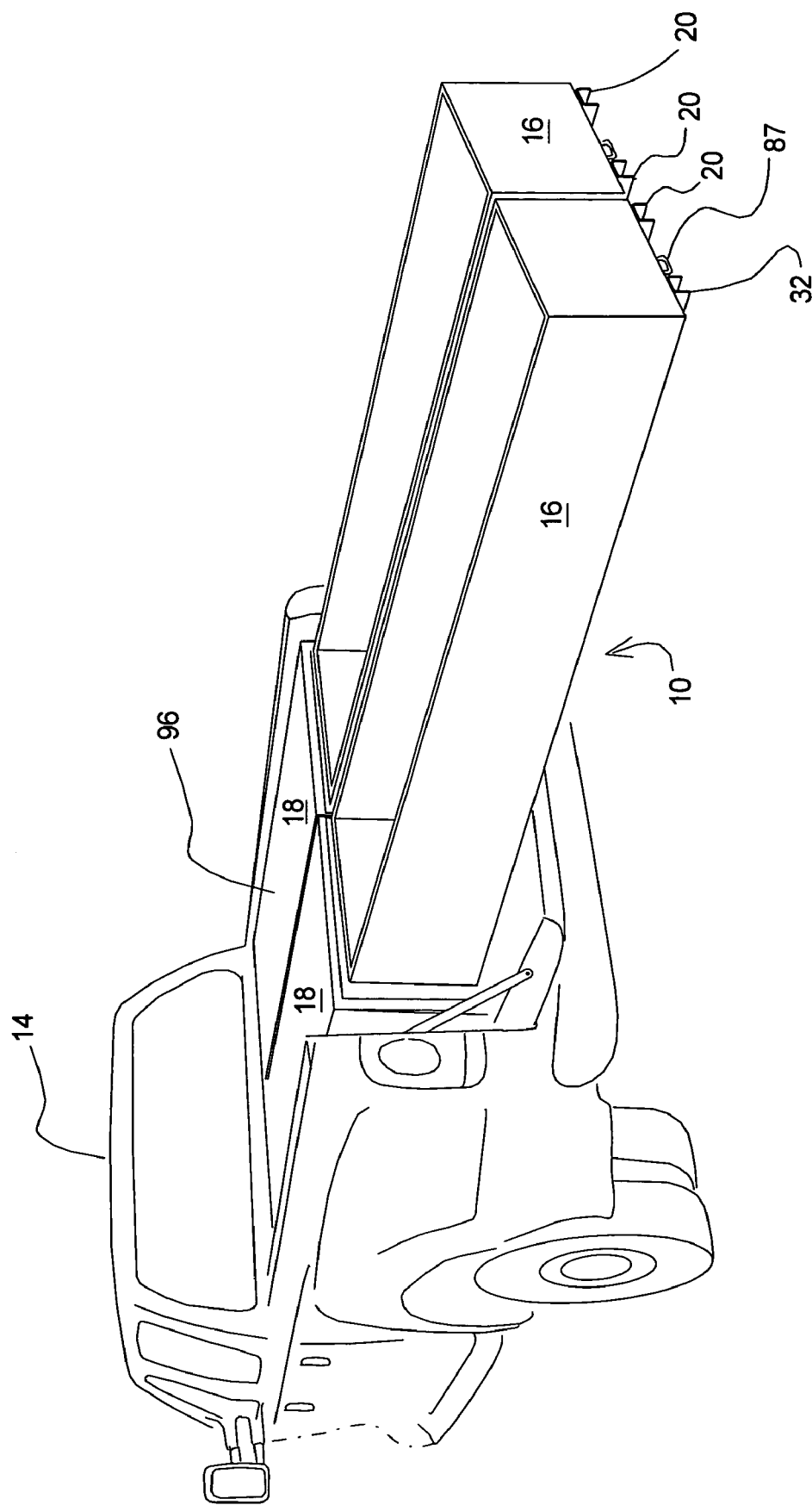
FIG. 1 illustrates an embodiment of the invention while in use as part of a drawer system mounted in the bed of a truck.

Turning now to FIG. 1 where an example of a retractable storage system for trucks 10 wile mounted on the bed 12 of a truck 14. The example of the storage system for trucks 10 has been illustrated as incorporating drawers 16 that are held within a case 18 that serves to conceal and protect the contents of the drawers 16. Each of the drawers 16 of this example a pair of the slide rail systems 20 that are used to support the load held within the drawers 16.

FIG. 2 illustrates another example of the use of the slide rail systems 20 to support a load support surface 22 that extends across most of the bed 12 of the truck 14. As illustrated in FIGS. 1 and 2 the use of the disclosed slide rail system 20 with the drawers 16, which incorporate a load support surface 22, allows the drawers 16 or the load support surface 22 that covers substantially all of the bed 12 of the truck 14 and to slide completely out of the bed 12 of the truck 14.

Turning to FIGS. 3 and 4 it will be understood that the disclose slide rail system 20 will provide sliding support to the load support surface 22 is attached to the bed 12 of the truck 14. The slide rail system 20 will include an elongated slide base 24 that includes an upwardly opening U-shaped cross-section 26. The slide base 24 is fastened to the bed 12 of the truck 14 such that the U-shaped cross-section 26 opens upward, so that it can accept an elongated intermediate slide 28.

FIG. 4 illustrates that the intermediate slide 28 also includes an upwardly opening U-shaped cross-section 30. Accordingly, the intermediate slide 28 nests in a sliding relationship within the U-shaped cross section 26 of the slide base 24 while the U-shaped cross-section 30 of the intermediate slide also faces upwards.

FIGS. 3 and 4 illustrate that nested within the U-shaped cross-section 30 of the intermediate slide 28 is a top slide 32. The top slide 32 includes a downwardly opening U-shaped cross-section 34. The downwardly opening U-shaped cross section 34 of the top slide 32 is formed from a horizontal portion 36 and spaced apart vertical sidewalls 38 that extend down from the horizontal portion 36 of the top slide 32. The top slide 32 also includes a first end 40 and a second end 42. The first end 40 of the top slide 32 includes at least one, but preferably a pair of wheels or rollers 44 on both sides of the top slide 32, so that the top slide 32 is between the rollers 44.

As illustrated in FIG. 3, the intermediary slide 28 will also include a first end 46 and a second end 48. Additionally, the U-shaped cross-section 30 of the intermediary slide 28 will be formed from a horizontal section 50 that is positioned between a pair of vertically extending sidewalls 52. The sidewalls 52 of the intermediate slide 28 terminate in a upper edge 54. A pair of horizontal wings 56 that are generally parallel to the horizontal section 50 extend from each of the upper edges 54. Each of the horizontal wings 56 is parallel to the horizontal section 50 of the intermediary slide 28, but as illustrated in FIG. 4, both are not necessarily at the same distance from the horizontal section 50.

As illustrated in FIG. 4, one of the horizontal wings 56, also referred to here as the internal wing 58, extends between the sidewalls 52 of the intermediary slide 28, while the other of the horizontal wings 56 extends away from both of the sidewalls 52 of the intermediary slide 28. The wings 56 that extend away from both sidewalls 52 are also referred to here as the external wings 60. The internal wings 58 cooperate with the rollers 44 of the top slide 32 by retaining the rollers 44 between the internal wings 58 and the horizontal section 50.

Additionally, FIG. 4 illustrates that the second end 48 of the intermediary slide 28 includes a centered roller 62 that supports the horizontal portion 36 of the top slide 32. Thus the top slide 32 is slideably supported by the intermediary slide 28, and the illustrated arrangement provides this support for the top slide 32 when it is directly over the slide base 24 (illustrated in FIG. 6) as well as when the top slide 32 is cantilevered from the intermediary slide 28 while in the extended position (shown in FIGS. 1, 2 and 5). Thus, the bending moment produced when the top slide is in the extended position is reacted by a force between the internal wings 58 and the rollers 44 and an opposite force between the horizontal portion 36 and the centered roller 62.

Figure 7:
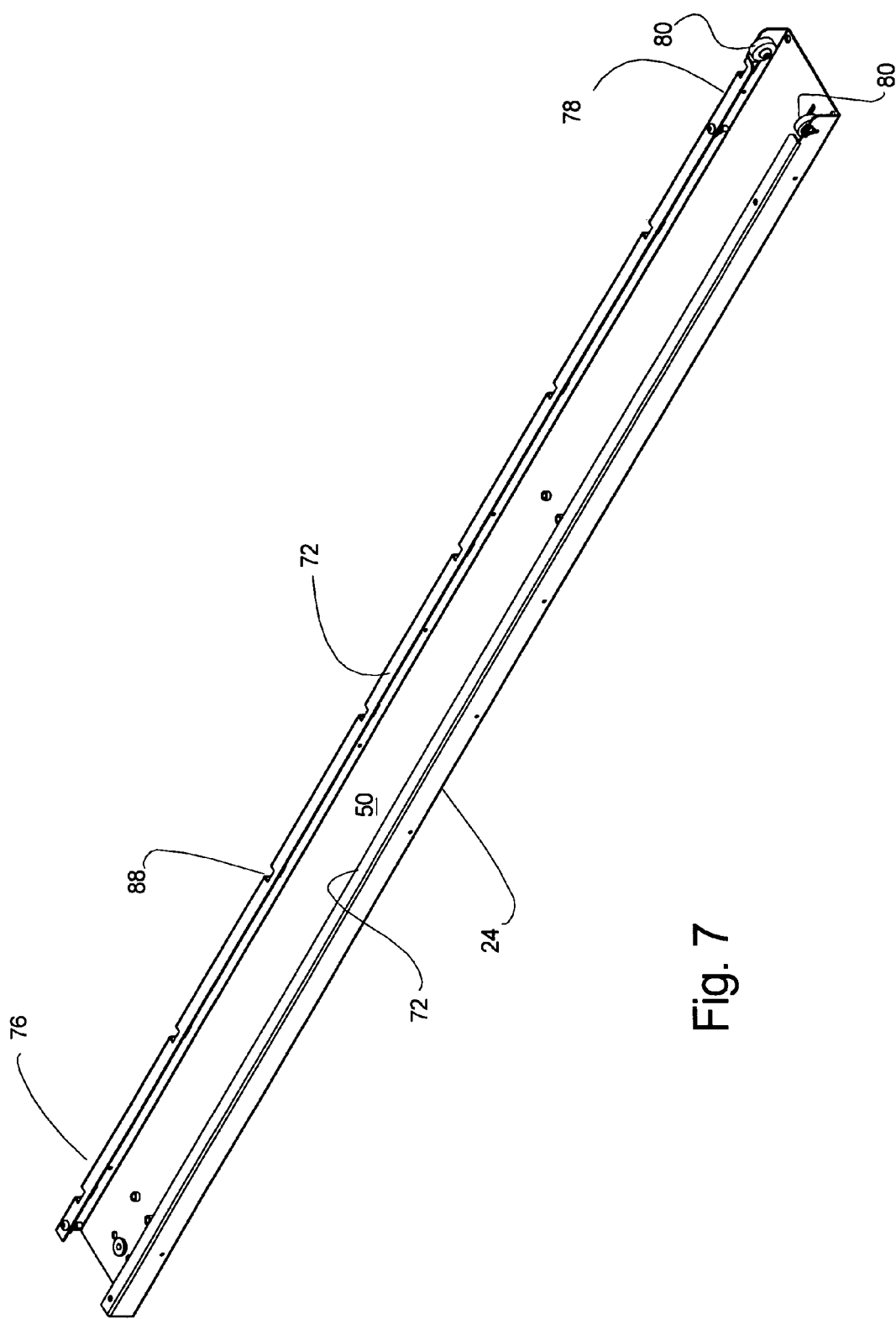
FIG. 7 is a perspective view of a highly preferred example of the slide base used with the invention.

The forces from the top slide 32 that are introduced into the intermediary slide 28 must be transferred into the slide base 24. As illustrated in FIGS. 4 and 7, the slide base 24 will include a pair of spaced apart vertical parallel sidewalls 66 that extend upwards from a base floor 68 that extends between the vertical parallel sidewalls 66 and together form the U-shaped cross-section 26. Additionally, each of the vertical parallel sidewalls 66 includes an upper edge 70 that include a horizontal cap 72. The horizontal caps 72 cooperate with a set of rollers 74 that are mounted near the first end 46 of the intermediate slide 28. It is contemplated that additional rollers 77 may be used in order to distribute loads from the intermediary slide 28 into the slide base 24 in an even manner.

FIGS. 3 and 4 illustrate that the slide base 24 also includes a first end 76 and a second end 78. The second end 78 includes a pair of rollers 80, one mounted next to each of the vertical parallel sidewalls 66, over the base floor 68. The rollers 80 will engage the external wings 60 of the intermediary slide 28 in order to provide sliding support to the intermediary slide 28. The rollers 80 on the slide base 24 will cooperate with the rollers 74 that are mounted from the first end of the intermediary slide 28 to provide sliding or rolling support for the intermediary slide 28 over the slide base 24. Additionally, the horizontal cap 72, and the base floor 68, of the slide base 24 will cooperate with the rollers 74 of the intermediary slide 28 to retain and provide a rolling surface for these rollers 74.

Figures 5, 6:
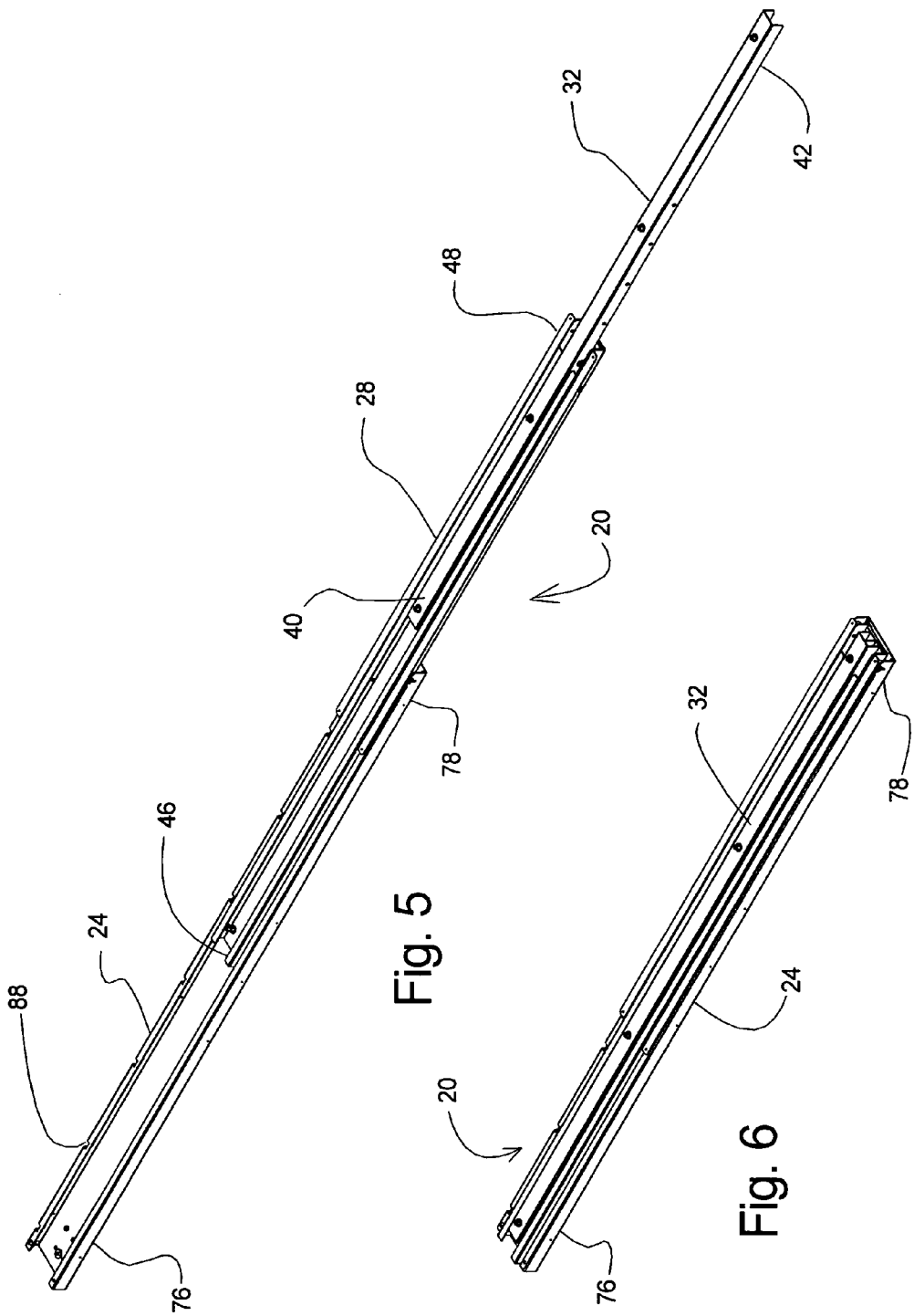
FIG. 5 is a perspective view of the slide system in an extended state, with no portion of the top slide positioned over the slide base.
FIG. 6 is a perspective view of the slide system in a collapsed state, with the top slide positioned over the slide base.

FIGS. 5 and 6 illustrate the assembled slides in a first position, illustrated in FIG. 6, where the top slide 32 and the intermediate slide 28 are directly over the slide base 24, and in a second position, illustrated in FIG. 5, where top slide 32 has been pulled out, extending the slides.

Turning to FIGS. 7, 10, 11A and 11B it will be understood that the slide base 24 will be used as part of a locking mechanism 82 for locking the position of the top slide 32 relative to the slide base 24. As shown in these figures, the locking mechanism 82 includes a rigid link 84 that is attached to the top slide 32. Usually this attachment of the rigid link 84 to the top slide 32 is accomplished by attaching the rigid link 84 to the load support surface 22, which is in turn rigidly attached to the top slide 32.

As illustrated in FIGS. 11A and 11B, the rigid link 84 is used to operate a retractable pin 86 that selectively engages the slide base 24 through a set of apertures 88 in the slide base 24. The rigid link is moved through the use of the handle 87, which is mounted near the second end 42 of the top slide 32. Insertion of the retractable pin 86 into one of the apertures 88 in the slide base 24 fixes the position of the top slide 32, and anything mounted from the top slide 32, relative to the slide base 24.

FIGS. 11A and 11B illustrate that the retractable pin 86 is operated through an angled link 90 that rotates in response to a pull of the rigid link 84. The rotation of the rigid link will pull the retractable pin 86 from the aperture in the slide base 24, as illustrated in FIG. 11A. The release of the rigid link 84 will cause the spring 92 to push the retractable pin 86 back into the aperture 88 in the slide base 24. It is important to note that the use of the retractable pin 86 locks the position of the load support surface 22 relative to the slide base 24, and that because the load support surface 22 is rigidly attached to the top slide 32 the locking of the load support surface also locks the position of the top slide 32. This arrangement has proven to be more reliable than the use of known arrangements that insert a pin through the extendable tracks or rails, locking two tracks or rails by inserting a shear pin through both tracks or rails.

Turning now to FIGS. 4, 7, 12, and 13 it will be understood that the disclosed arrangement will allow the vertical sidewalls 66 of the slide base 24 to accept fasteners such that the fasteners will not interfere with the movement of the rollers 74 that are externally mounted on the intermediate slide 28. This clearance for fasteners allows the slide base 24 to be used as a location for supporting the side panels 94 that are used to construct the case 18. Thus, in the example illustrated in FIGS. 12 and 13, a pair of the slide rail systems 20 are used in a modular manner to support the load support surface 22 and the side panels 94 that are used to form the case 18. The side panels 94 support the top panel 96 of the case 18, and the end panel 98 may be attached directly to the side panels 94 and to the first end of the slide base 24 if desired.

Figures 12, 12A:
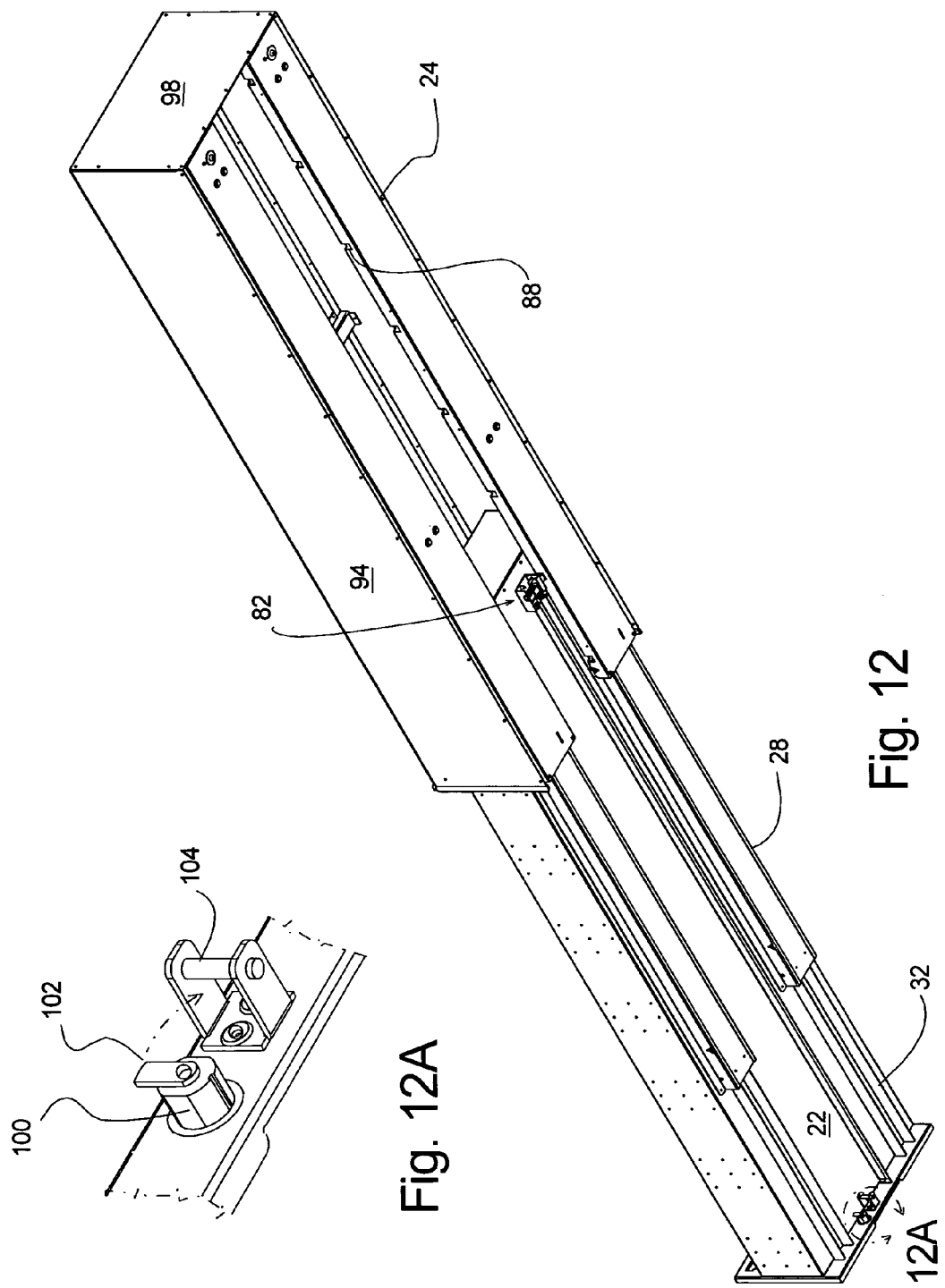
FIG. 12 is a perspective view looking up from the rear towards the front of a drawer and case that use the disclosed slide system.
FIG. 12A illustrates a preferred example of the use of a pushbutton lock to lock the handle that operates the locking mechanism of the example illustrated in FIG. 12.
Figure 13:
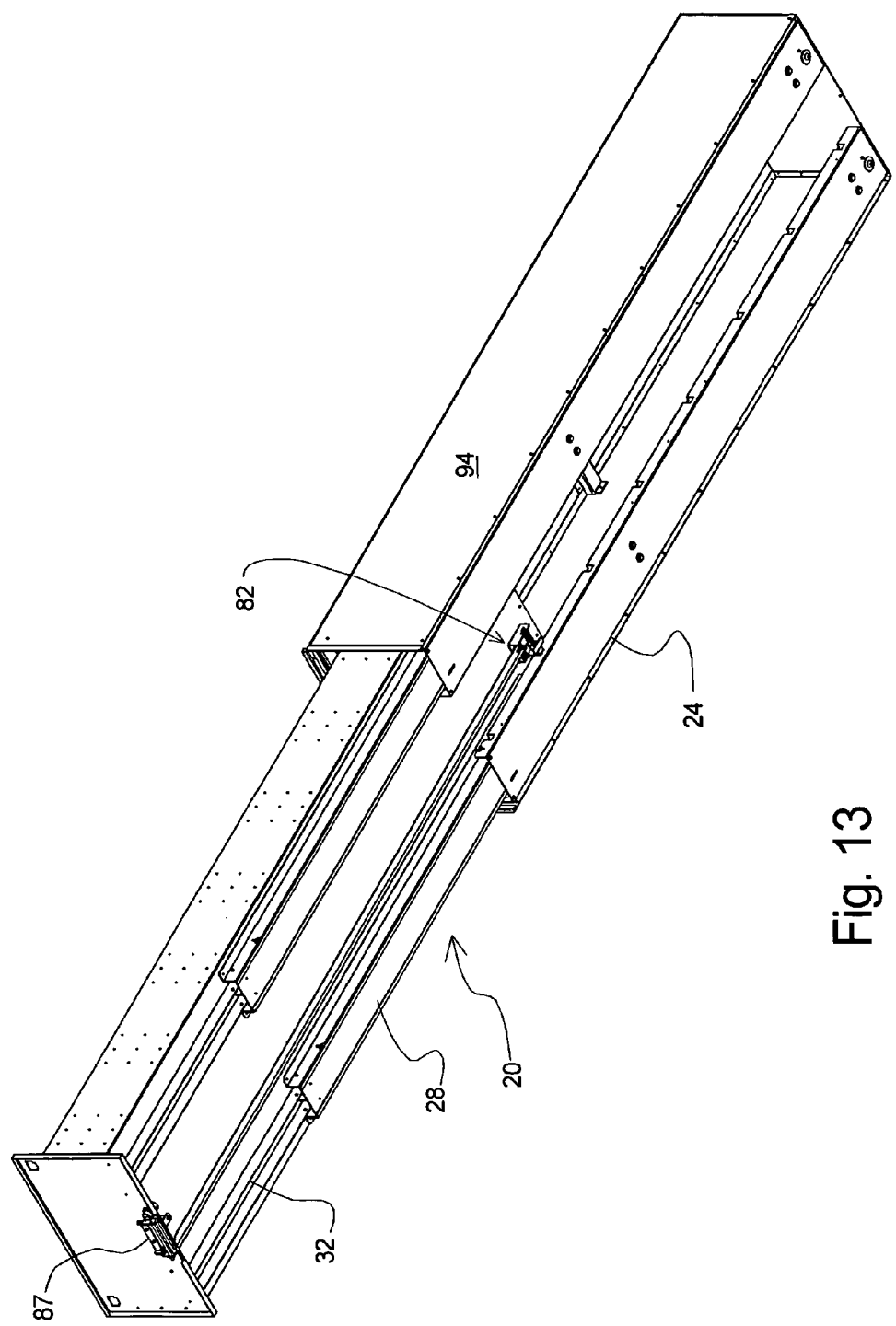
FIG. 13 is a perspective view looking up from the front towards the rear of a drawer and case that use the disclosed slide system.

Turning to FIG. 12A it will be understood that it is contemplated that a pushbutton lock 100, of type disclosed in my U.S. Pat. No. 6,564,602, incorporated herein by reference in its entirety. The pushbutton lock 100 includes a cam 102 that is rotated under a latch 104 that is connected to the handle 87 that is used to pull on the rigid link 84 that actuates the locking mechanism 82. Thus, rotating the cam 102 under the latch 104 prevents movement of the handle 87, which also prevents the release of the locking mechanism 82 and keeps the drawer 16 from being moved from its position relative to the slide base 24.

Figure 8:
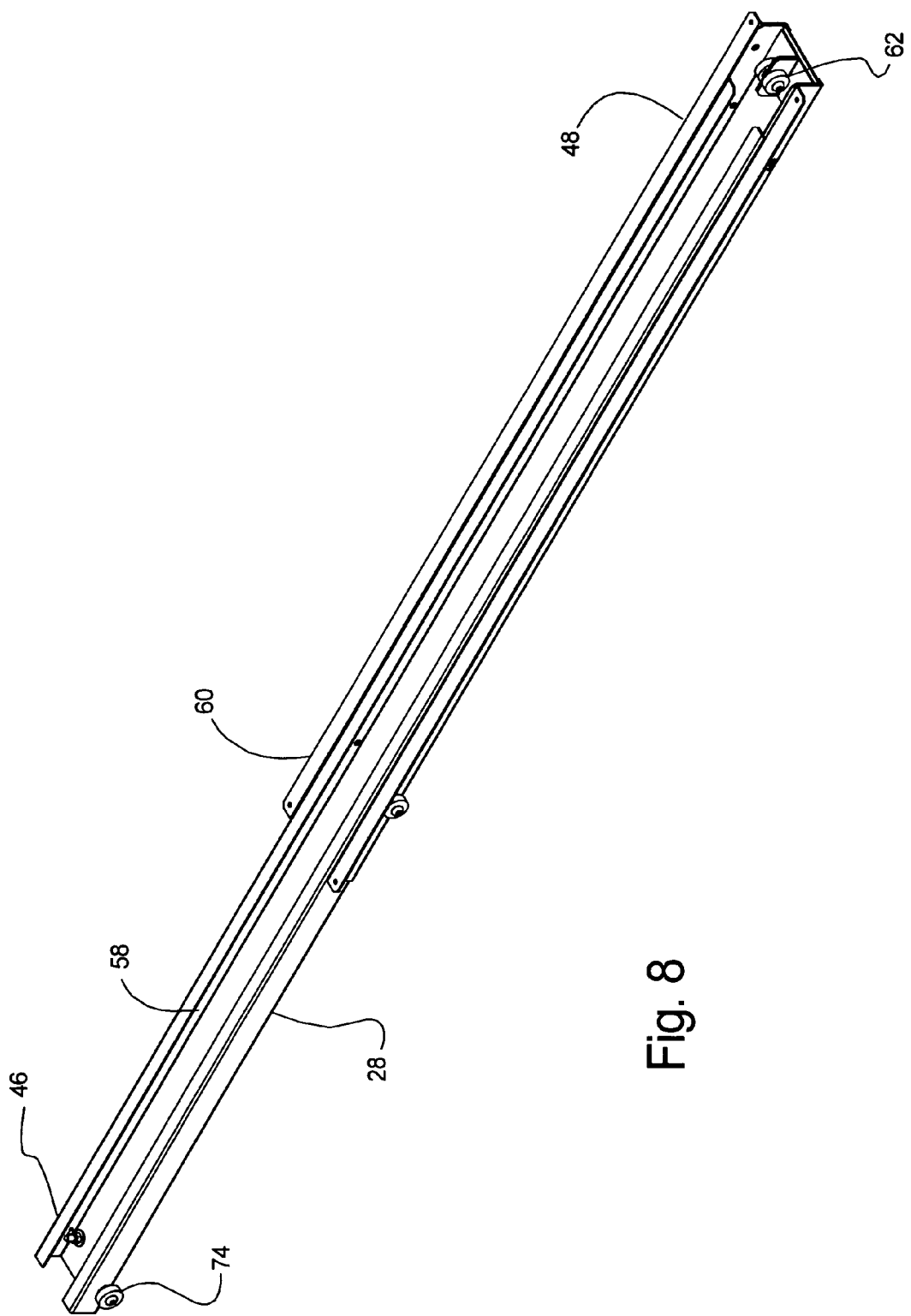
FIG. 8 is a perspective view of a highly preferred example of the intermediate slide used with the invention.

FIG. 8 illustrates a preferred example of the intermediate slide 28. In this example the external wings 60 do not extend through the entire length of the intermediate slide 28. This is because the rollers 80 (which cooperate with the external wings 60) on the second end 78 of the slide base 24 need not travel the entire length of the intermediate slide 28 in order to allow the top slide 32 to extend completely out of the bed 12 of the truck 14.

Figure 9:
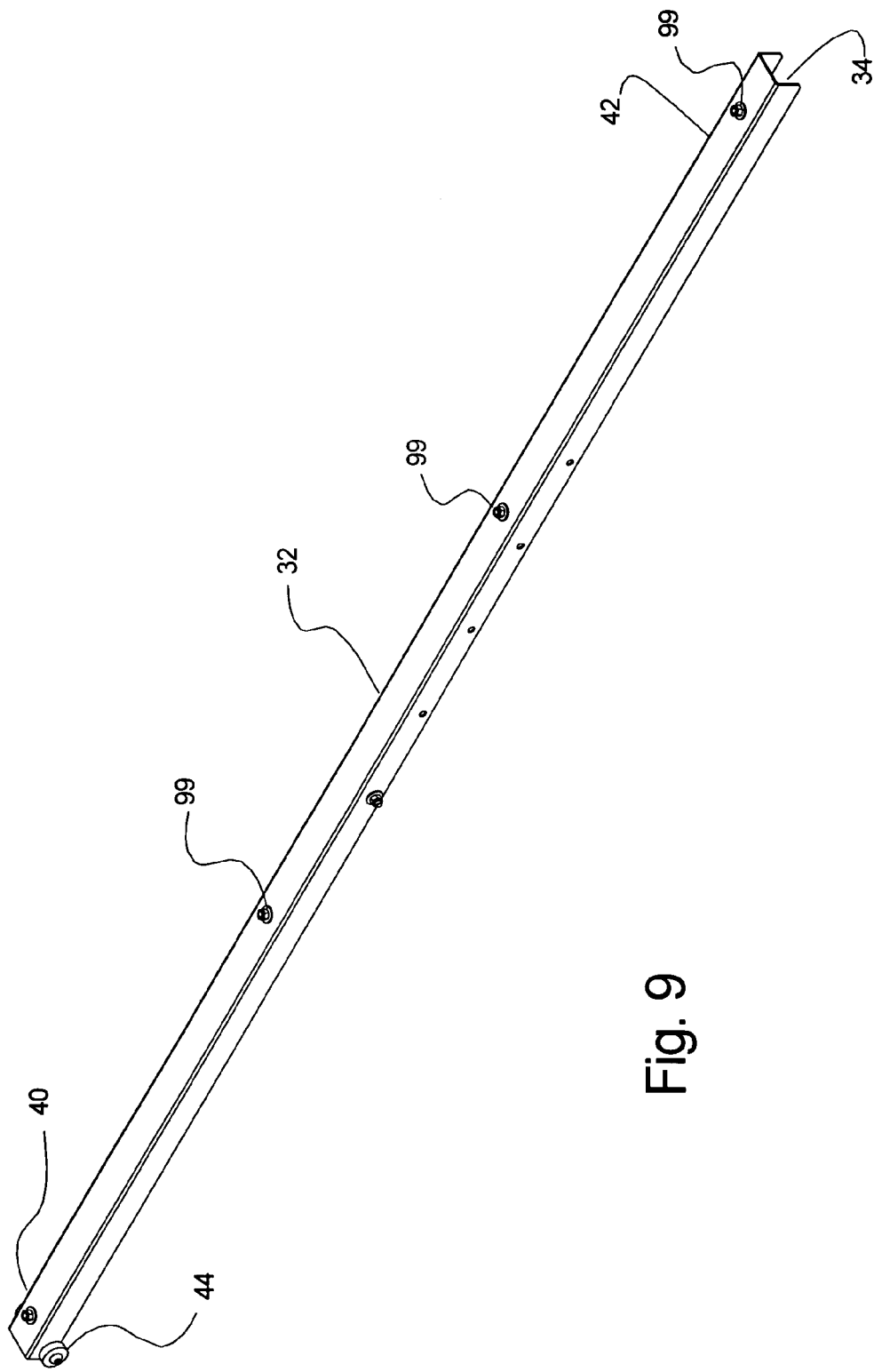
FIG. 9 is a perspective view of a highly preferred example of the top slide used with the invention.

FIG. 9 provides a preferred example of the top slide 32. The example illustrates locations of fasteners 99 used to attach the load support surface 22 to the top slide 32.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A slide rail system for providing sliding support for a load support surface mounted on the bed of a truck, the system comprising:
    an elongated slide base having an upwardly opening U-shaped cross-section;
    an elongated intermediate slide having an upwardly opening U-shaped cross-section, the intermediate slide being adapted for nesting in a sliding relationship within the U-shaped cross section of the slide base;
    a top slide, the top slide having a downwardly opening U-shaped cross-section, the top slide being adapted for nesting in a sliding relationship within the U-shaped cross-section of the intermediate slide, so that when the load support surface that is attached to the top slide, so that mounting the slide base to the bed of the truck allows the load surface to be slid in and out of the bed of the truck.

2. A slide rail system according to claim 1 wherein the slide base includes a first end and a second end, and the U-shaped cross-section is formed from a pair of spaced apart sidewalls that extend away from a base floor and terminate in an upper edge, the upper edge of the sidewalls including a generally horizontal flange that extends over the base floor, the sidewalls of the slide base further comprising a set of rollers at second end of the slide base.

3. A slide rail system according to claim 2 wherein the intermediary slide further comprises a first end, a second end and a mid-section, the intermediary further having a generally U-shaped cross-section defined by a horizontal section and a pair of generally vertical parallel sidewalls that extend from the horizontal section and terminate in an upper edge away from the horizontal section, the upper edge of the sidewalls of the intermediary slide further comprising a pair of horizontal wings that extend on both sides of the sidewalls of the intermediary section;
    the intermediary slide further comprising a set of rollers that are mounted on the sidewalls of the intermediary slide near the first end of the intermediary slide, the rollers being positioned such that the intermediary slide lies between the rollers, and a roller that is mounted over the horizontal section of the intermediary slide, between the sidewalls of the intermediary slide at a location near the second end of the intermediary slide.

4. A slide rail system according to claim 3 wherein the top slide comprises an elongated body having a U-shaped cross-section, the top slide further comprising a top slide first end and a top slide second end, the U-shaped cross-section being defined by a horizontal cap and a pair of spaced apart sidewalls that extend downward from the horizontal cap, so that the U-shaped cross-section of the top slide nests within the U-shaped cross-section of the intermediate slide, which in turn nests within the U-shaped cross-section of the slide base.

5. A slide rail system according to claim 4 and further comprising a locking mechanism for locking the position of the intermediate slide and the top slide relative to the slide base, the locking mechanism comprising a retractable that is attached to the top slide, the retractable pin that selectively engaging the slide base, so that on engagement of slide base by the retractable pin fixes the position of the top slide relative to the slide base.

6. A slide system comprising:
    an elongated slide base, the slide base having first end and a second end and further having a U-shaped cross-section defined by a base floor and a pair of spaced apart parallel base sidewalls that extend away from the base floor at an angle to the base floor, the second end of the slide base having a pair of spaced apart roller supports mounted at the second end of the slide base;
    an elongated intermediate slide having a first end, a second end and a mid-section, the intermediary slide having a generally U-shaped cross-section defined by a horizontal section and a pair of generally vertical parallel sidewalls extending from the horizontal section to define a mouth therebetween, the sidewalls having a upper edge a distance from the horizontal section, at least a portion of the upper edge having of each sidewall having a pair of horizontal wings extending from the upper edge of each of the sidewalls, the wings being generally parallel to the horizontal section and extending on opposite sides of each of the sidewalls, so that one of the wings extends into the mouth portion while the other wing extends away from the mouth portion, each of the wings that extend away from the mouth portion being adapted for engaging one of the roller supports of slide base, the intermediate slide having a first pair of rollers mounted from the sidewalls of the intermediate slide at a location near the first end of the intermediate slide, the first pair of rollers being positioned away from the mouth portion of the intermediate slide, the intermediate slide further having at least one roller mounted from the horizontal section of the intermediate slide, in the mouth of the intermediate slide, at a location near the second end of the intermediate slide; and
    a top slide having an inverted U-shaped cross-section defined by horizontal cap and a pair of spaced apart parallel sidewalls extending down from the cap, the inverted top slide having a first end and a second end, the first end having a pair of roller supports mounted from the parallel sidewalls of the top slide, with the parallel sidewalls of the top slide being between the pair of roller supports of the top slide.

7. A slide system according to claim 6 and further comprising a locking mechanism for selectively retaining the position of the top slide relative to the slide base.

8. A slide system according to claim 7 wherein said locking mechanism comprises a retractable pin that selectively engages the slide base, the retractable pin selectively securing the position of the top slide relative to the slide base.

9. A slide system according to claim 6 and further comprising a load surface that is attached to the top slide.

10. A slide system according to claim 6 and further comprising a drawer that is attached to the top slide.

11. A slide system according to claim 10 and further comprising a case for covering the drawer when the top slide is directly over the slide base.

12. A method allowing tailoring the load carrying capacity of a retractable load carrying device for a pickup truck, the method comprising:
    providing a load surface for carrying a load;
    providing at least one slide system, the slide system comprising:

an elongated slide base having an upwardly opening U-shaped cross-section;

an elongated intermediate slide having an upwardly opening U-shaped cross-section, the intermediate slide being adapted for nesting in a sliding relationship within the U-shaped cross section of the slide base;

a top slide, the top slide having a downwardly opening U-shaped cross-section, the top slide being adapted for nesting in a sliding relationship within the U-shaped cross-section of the intermediate slide, so that when the load support surface that is attached to the top slide, so that mounting the slide base to the bed of the truck allows the load surface to be slid in and out of the bed of the truck.

13. A method according to claim 12 and further comprising a locking mechanism for selectively retaining the position of the top slide relative to the slide base by providing a rigid link that selectively engages the slide base, the rigid link being attached to the top slide.

14. A method according to claim 12 wherein said load surface further comprises a drawer.

15. A method according to claim 14 and further comprising covering the drawer with a case when the top slide is directly over the slide base.

16. A method according to claim 12 wherein the slide base includes a first end and a second end, and the U-shaped cross-section is formed from a pair of spaced apart sidewalls that extend away from a base floor and terminate in an upper edge, the upper edge of the sidewalls including a generally horizontal flange that extends over the base floor, the sidewalls of the slide base further comprising a set of rollers at second end of the slide base.

17. A method according to claim 16 wherein the intermediary slide further comprises a first end, a second end and a mid-section, the intermediary further having a generally U-shaped cross-section defined by a horizontal section and a pair of generally vertical parallel sidewalls that extend from the horizontal section and terminate in an upper edge away from the horizontal section, the upper edge of the sidewalls of the intermediary slide further comprising a pair of horizontal wings that extend on both sides of the sidewalls of the intermediary section;

the intermediary slide further comprising a set of rollers that are mounted on the sidewalls of the intermediary slide near the first end of the intermediary slide, the rollers being positioned such that the intermediary slide lies between the rollers, and a roller that is mounted over the horizontal section of the intermediary slide, between the sidewalls of the intermediary slide at a location near the second end of the intermediary slide.

18. A slide rail system according to claim 17 wherein the top slide comprises an elongated body having a U-shaped cross-section, the top slide further comprising a top slide first end and a top slide second end, the U-shaped cross-section being defined by a horizontal cap and a pair of spaced apart sidewalls that extend downward from the horizontal cap, so that the U-shaped cross-section of the top slide nests within the U-shaped cross-section of the intermediate slide, which in turn nests within the U-shaped cross-section of the slide base.

\* \* \* \* \*